United States Patent
Paul et al.

(10) Patent No.: US 11,777,818 B1
(45) Date of Patent: Oct. 3, 2023

(54) DRIFT RESOLVER FOR ENTERPRISE APPLICATIONS

(71) Applicant: Oracle International Corporation, Redwood Shores, CA (US)

(72) Inventors: Keynes Paul Paul, Gilroy, CA (US); Ramakrishnan Paranthaman, Dublin, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 17/712,552

(22) Filed: Apr. 4, 2022

(51) Int. Cl.
- *H04L 41/50* (2022.01)
- *G06F 16/21* (2019.01)
- *H04L 41/5009* (2022.01)

(52) U.S. Cl.
CPC .......... *H04L 41/5032* (2013.01); *G06F 16/21* (2019.01); *H04L 41/5016* (2013.01)

(58) Field of Classification Search
CPC .. H04L 41/5032; H04L 41/5016; G06F 16/21
USPC ........................................................ 709/224
See application file for complete search history.

(56) References Cited

U.S. PATENT DOCUMENTS

| | | | | |
|---|---|---|---|---|
| 11,321,462 | B2 * | 5/2022 | Jaenisch | G06F 21/566 |
| 11,341,235 | B2 * | 5/2022 | Jaenisch | G06F 21/54 |
| 11,373,672 | B2 * | 6/2022 | Mesgarani | H04R 25/507 |
| 2020/0041967 | A1 * | 2/2020 | Shrivastava | G02F 1/163 |
| 2020/0301943 | A1 * | 9/2020 | Robinson | G06F 16/5846 |
| 2021/0042570 | A1 * | 2/2021 | Iskandar | G06F 11/3006 |
| 2022/0004897 | A1 * | 1/2022 | Jadon | G06N 5/04 |
| 2022/0011729 | A1 * | 1/2022 | Shrivastava | G02F 1/163 |
| 2022/0014963 | A1 * | 1/2022 | Yeh | G06N 3/044 |
| 2022/0121884 | A1 * | 4/2022 | Zadeh | G06F 18/2185 |
| 2022/0123849 | A1 * | 4/2022 | McCall | H04W 56/001 |
| 2022/0134547 | A1 * | 5/2022 | Cristache | G06N 5/022 |
| | | | | 700/245 |
| 2022/0164643 | A1 * | 5/2022 | Charnock | G06N 5/046 |
| 2022/0187841 | A1 * | 6/2022 | Ebrahimi Afrouzi | |
| | | | | G05D 1/0242 |
| 2022/0200869 | A1 * | 6/2022 | Erlingsson | H04L 67/10 |
| 2022/0215101 | A1 * | 7/2022 | Rioux | G06F 21/55 |
| 2022/0247769 | A1 * | 8/2022 | Erlingsson | H04L 63/1441 |
| 2022/0277254 | A1 * | 9/2022 | Feeney | H04W 4/38 |
| 2022/0279004 | A1 * | 9/2022 | Erlingsson | G06F 17/40 |
| 2022/0360600 | A1 * | 11/2022 | Reed | H04L 63/1425 |
| 2023/0032686 | A1 * | 2/2023 | Williams | G06F 16/9537 |

* cited by examiner

*Primary Examiner* — Melvin H Pollack
(74) *Attorney, Agent, or Firm* — Kilpatrick Townsend & Stockton LLP

(57) ABSTRACT

A framework for performing drift analysis with respect to database and enterprise applications. For a product for which drift analysis is to be performed, a set of one or more parts of the product are determined. Current state information for the set of one or more parts is obtained by crawling an environment in which the product is deployed. Current state information obtained for the set of one or more parts is compared with a baseline for the product. The comparison aids to identify one or more differences between the current state information and information in the baseline for the set of one or more parts. The information in the baseline for the set of one or more parts is indicative of a state of the set of one or more parts when the baseline was generated. A report indicative of the one or more differences is generated and output.

20 Claims, 12 Drawing Sheets

DRIFT RESOLVER FOR ENTERPRISE APPLICATIONS

FIELD

The present disclosure relates to a framework for performing drift analysis with respect to enterprise applications and databases.

BACKGROUND

Today's information technology (IT) and services departments in various organizations are faced with the difficult and challenging task of ensuring that one or more enterprise applications are always available and provide adequate performance. As the complexity of IT systems increases, tasks such as monitoring, debugging, and performance analysis of the enterprise's applications are becoming time-consuming and labor-intensive. For larger IT projects, it is not uncommon for the cost factors related to performance tuning, performance management, and capacity planning to result in one of the largest and least controlled expense for an organization.

Automated tools for understanding application behavior and its changes during the application life-cycle are essential for many performance analysis and debugging tasks. Application performance issues have an immediate impact on customer experience and satisfaction. A sudden slowdown of enterprise-wide application can effect a large population of customers, lead to delayed projects, and ultimately can result in an organization's financial loss. Significantly shortened time between new software releases further exacerbates the problem of thoroughly debugging (e.g., identifying changes in the application) and evaluating the performance of an updated application. Embodiments discussed herein address these and other issues individually as well as collectively.

SUMMARY

The present disclosure relates generally to a framework for performing drift analysis with respect to enterprise applications and databases. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure provides for a method comprising for a product for which drift analysis is to be performed, determining a set of one or more parts of the product; obtaining current state information for the set of one or more parts by crawling an environment in which the product is deployed; comparing the current state information obtained for the set of one or more parts with a baseline generated for the product to identify one or more differences between the current state information and information in the baseline for the set of one or more parts, wherein the information in the baseline for the set of one or more parts is indicative of a state of the set of one or more parts when the baseline was generated; generating a report indicative of the one or more differences; and outputting the report.

Another aspect of the present disclosure provides for a computing device comprising a processor; and a memory including instructions that, when executed with the processor, cause the computing device to, at least: for a product for which drift analysis is to be performed, determining a set of one or more parts of the product; obtain current state information for the set of one or more parts by crawling an environment in which the product is deployed; compare the current state information obtained for the set of one or more parts with a baseline generated for the product to identify one or more differences between the current state information and information in the baseline for the set of one or more parts, wherein the information in the baseline for the set of one or more parts is indicative of a state of the set of one or more parts when the baseline was generated; generate a report indicative of the one or more differences; and output the report.

Another aspect of the present disclosure provides a computer readable medium storing specific computer-executable instructions that, when executed by a processor, cause a computer system to perform operations comprising: for a product for which drift analysis is to be performed, determining a set of one or more parts of the product; obtaining current state information for the set of one or more parts by crawling an environment in which the product is deployed; comparing the current state information obtained for the set of one or more parts with a baseline generated for the product to identify one or more differences between the current state information and information in the baseline for the set of one or more parts, wherein the information in the baseline for the set of one or more parts is indicative of a state of the set of one or more parts when the baseline was generated; generating a report indicative of the one or more differences; and outputting the report.

The foregoing, together with other features and embodiments will become more apparent upon referring to the following specification, claims, and accompanying drawings.

DETAILED DESCRIPTION

Figure 1:
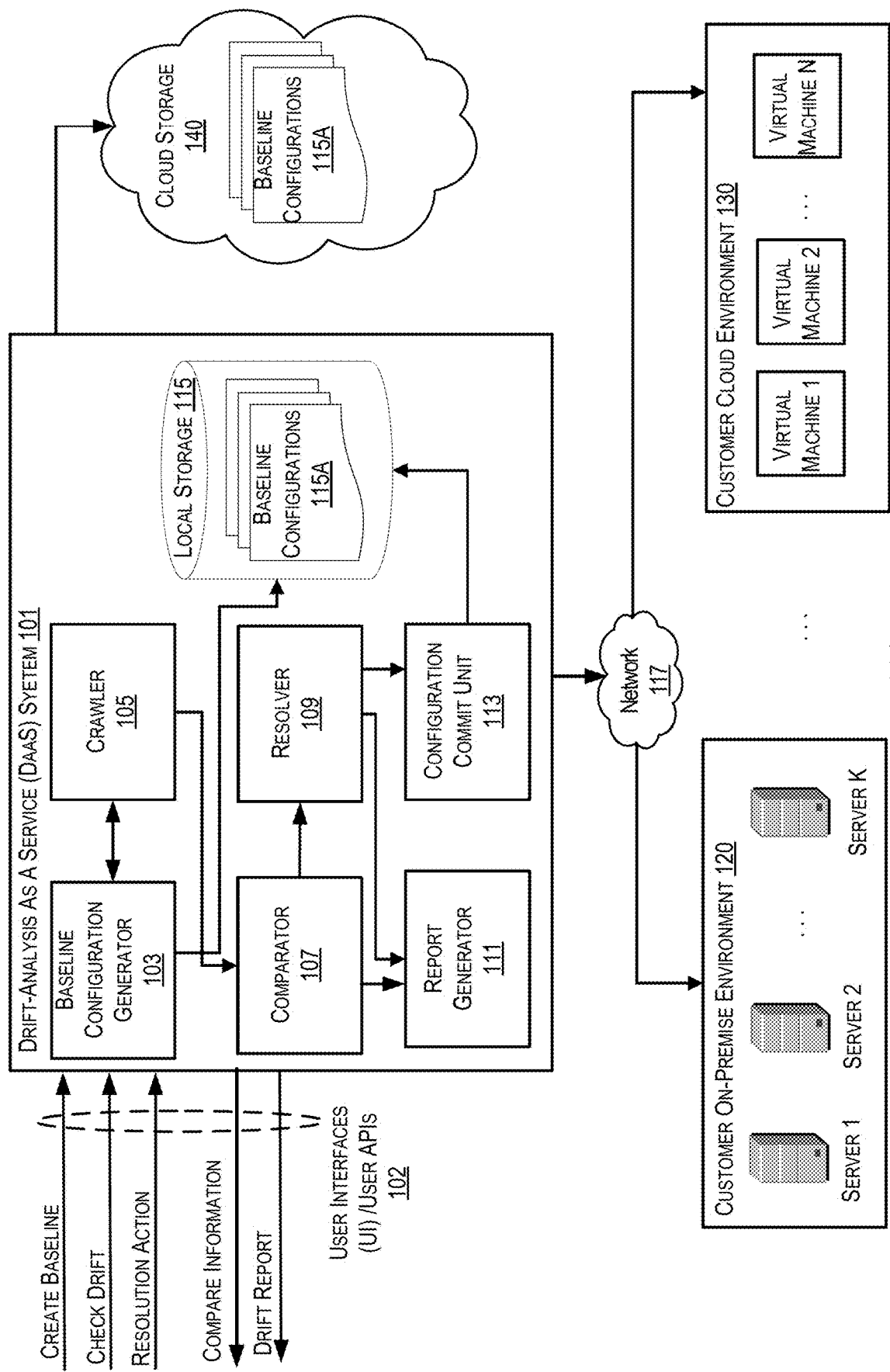
FIG. 1 depicts an exemplary architecture of drift-analysis as a service (DaaS) system in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Information technology (IT) and services departments in various organizations are faced with a difficult and challenging task of ensuring that one or more enterprise applications are always available and provide adequate performance. As the complexity of IT systems increases, tasks such as monitoring, debugging, and performance analysis of the enterprise's applications are becoming more time-consuming and labor-intensive. Automated tools for understanding application behavior and its changes during the application life-cycle are essential for many performance analysis and debugging tasks. Application performance issues have an immediate impact on customer experience and satisfaction. A sudden slowdown of enterprise-wide application can effect a large population of customers.

Enterprise applications now have a wider definition that include multiple types e.g., legacy, web, or software as a service (SaaS). Moreover, such enterprise applications may be deployed across different geographical locations e.g., data center, Internet, public cloud, etc. Performance characteristics (i.e., response time, throughput, resource utilization) of enterprise applications change for each version due to feature additions, bug fixes or configuration changes. Therefore, performance needs to be continuously evaluated to detect performance changes (i.e., improvements or regressions).

With complexity of systems increasing and customer requirements for QoS growing, a challenge is to design an automated and integrated framework that detects/identifies for instance, changes in components of the application as well as changes in databases associated with the enterprise's applications that may be caused due to factors such as a production outage, a planned/scheduled maintenance update, personnel error, etc. Furthermore, it is desired to identify at what level of the enterprise's architecture (e.g., a database level, a network level, compute level, storage level, etc.) the changes have occurred, how many files of the application have been modified/changed, identify processes that caused the change, how many parameters/values have been changed in an application's artifact, etc.

Described below is a system that is referred to herein as a drift-analysis as a service (DaaS) system that addresses the above stated issues and provides for a shorter mean-time-to-restore (MTTR) application artifacts, enterprise databases, etc., and reduced SLA penalties. For sake of convenience, an enterprise application (e.g., PeopleSoft, Fusion Middleware, E-Business suite, etc.) is referred to herein as a 'product'. The product can be deployed in various environments such as an on-premise customer environment (e.g., datacenter) or in a customer's cloud environment. Moreover, as will be described below in detail, the product may include a set of one or more parts (e.g., a hierarchy of parts) that make up the product.

Turning to FIG. 1, there is depicted an exemplary architecture of drift-analysis as a service (DaaS) system in accordance with various embodiments. The DaaS system 101 includes a baseline configuration generator 103, a crawler 105, a comparator 103, a resolver 109, a report generator 111, a configuration commit unit 113, and a local storage 115. Users can interact with the DaaS system 101 via user interfaces or APIs 102.

A product may be deployed in a customer's environment across different host machines. For instance, a first type of customer environment may correspond to one or more servers deployed in a customer's on-premise environment 120 (e.g., a datacenter). The product may alternatively be deployed in a customer's cloud environment 130 i.e., the product may be executed by one or more virtual machines included in the customer's cloud environment 130. It is appreciated that one or more parts of the product (e.g., applications, databases, etc.) may be deployed/executed on different servers/virtual machines within a customer's environment. The DaaS system 101 may communicate with such environments via a communications network 117. The communications network 117 may be any suitable communications network such as one and/or a combination of the following types of network: a direct interconnection, the Internet, a Local Area Network (LAN), a Metropolitan Area Network (MAN), a Wide Area Network (WAN) or a wireless network (e.g., employing protocols such as, but not limited to a Wireless Application Protocol (WAP), I-mode), and/or the like.

A user may transmit, via the user interfaces or APIs 102, a request to the DaaS system 101 to create a baseline configuration for a product deployed in the customer's environment. The baseline configuration corresponds to information related to the set of one or more parts of the product and is indicative of a state of the product. By one embodiment, the request issued by the user may include information identifying the product (e.g., a product name or an identifier associated with the product), information regarding the environment (e.g., identifiers related to the one or more servers 120, or one or more virtual machines in the cloud 130) in which the product is deployed. In some implementations, the user request may also include information pertaining to the one or more parts that are included in the product (e.g., a configuration file of the product).

Figure 2:
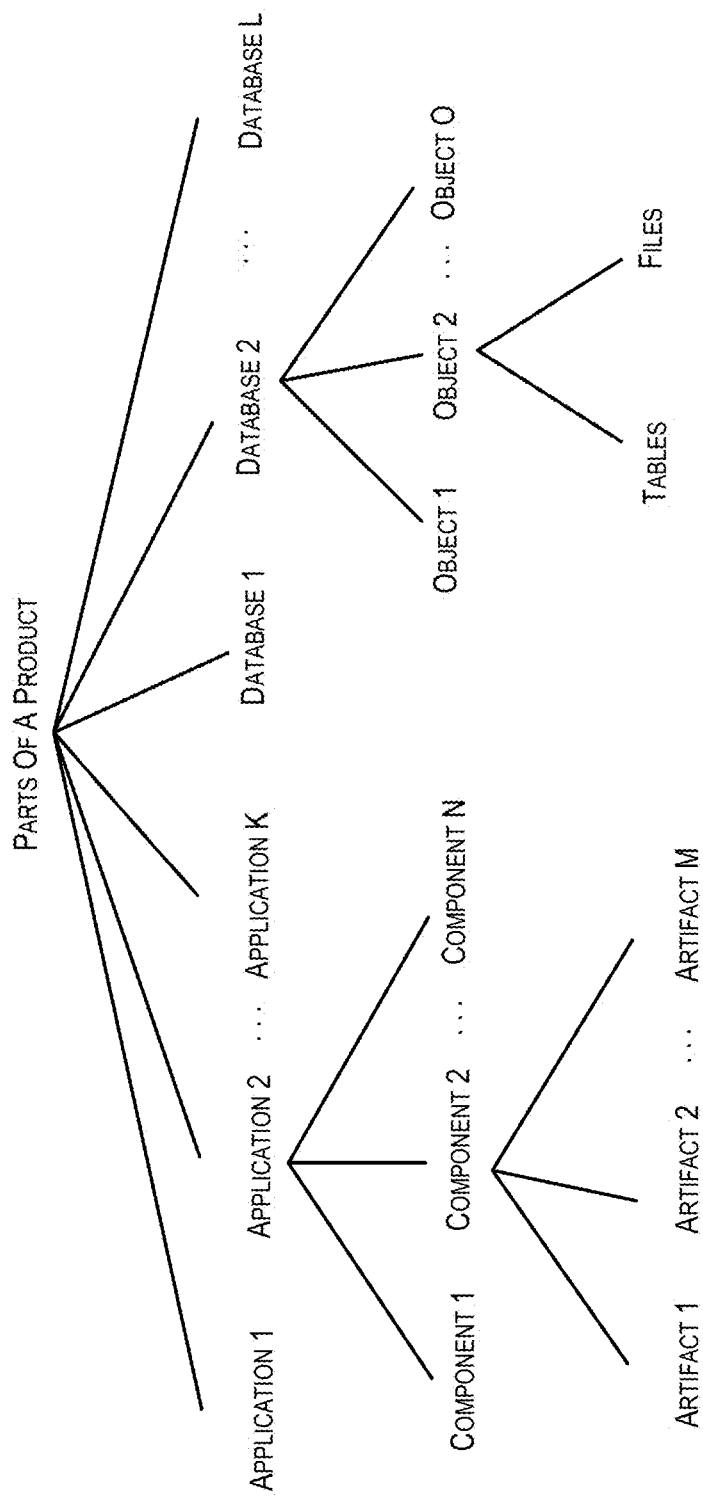
FIG. 2 depicts a tree diagram illustrating parts of a product in accordance with various embodiments.

As shown in FIG. 2, the parts of a product may include one or more applications (e.g., application 1-application K) and one or more databases (e.g., database 1 to database L). Each application may include one or more components (e.g., application 2 includes N components labeled component 1-component N). The components of an application work in a collaborative manner to make the application perform in a specific manner. For instance, the components of an application may include a process scheduler, an application server, an integration broker, a webserver, etc. Each component of an application may further comprise one or more application artifacts that are required in order to ensure smooth operation of the component of the application. For instance, an application artifact may correspond to binary files, executable code, configuration code (e.g., YAML code), etc.

In a similar manner, the part(s) of the product corresponding to databases may further comprise one or more database objects. For instance, as shown in FIG. 2, database 2 includes a plurality of objects (i.e., object 1, object 2 . . .

object O). Each of the database objects may include one or more of a file or a table. It is appreciated that each of the above-described parts of a product may be deployed/executed across one or more different servers/virtual machines within a customer's environment. For instance, a first set of artifacts of an application may be executed on a first set of servers, whereas a second set of artifacts (different from the first set of artifacts) may be deployed/executed on a second set of servers (different from the first set of servers).

Figure 3A:
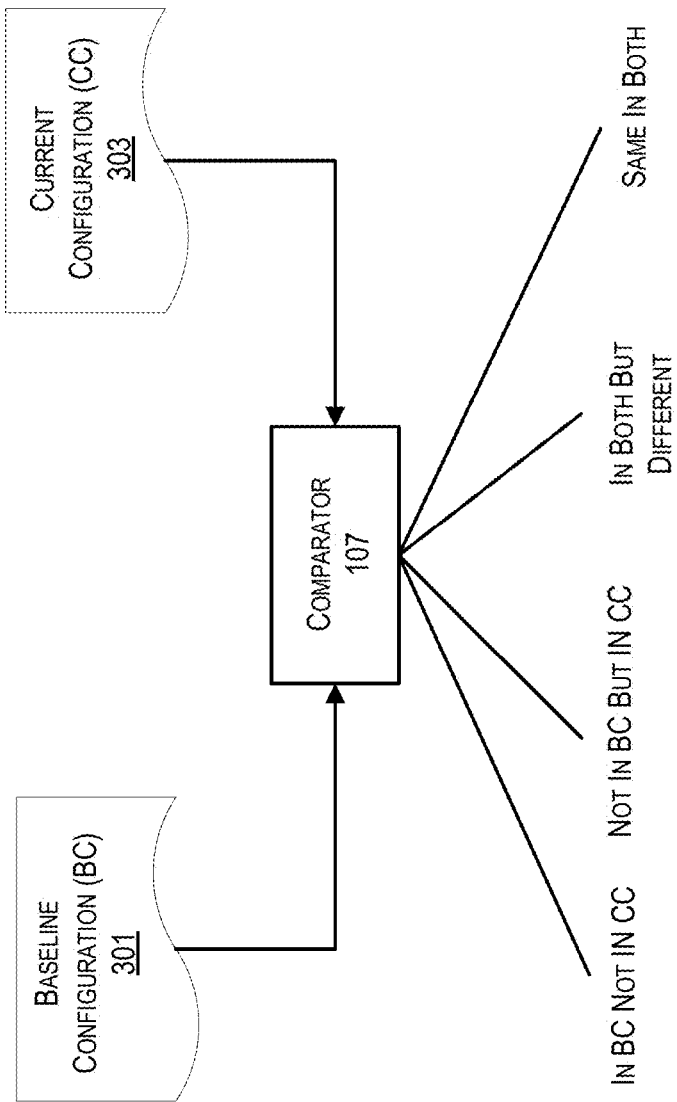
FIG. 3A depicts operations performed by a comparator of the DaaS system in accordance with various embodiments.
Figure 3B:
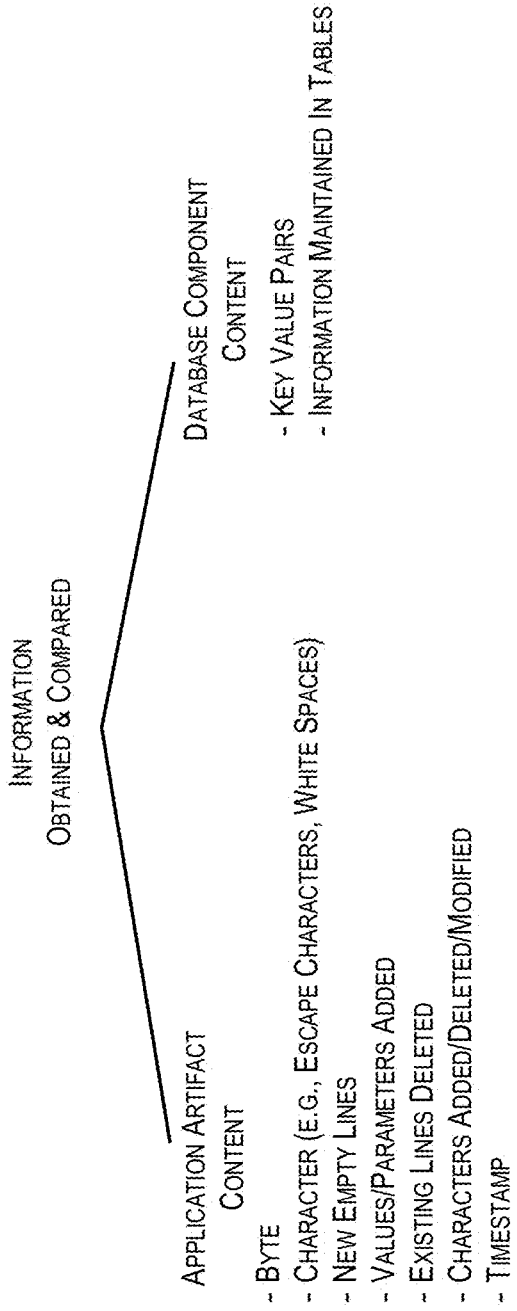
FIG. 3B depicts a tree diagram illustrating information obtained and compared by the comparator of the DaaS system according to certain embodiments.

Turning back to FIG. 1, upon the baseline configuration generator 103 receiving the request from the user (i.e., request to create a baseline configuration for a product), the baseline configuration generator 103 triggers the crawler 105. The crawler 105 may be a web-crawler or a spider (e.g. a script) that is configured to crawl the customer's environment to obtain information that is indicative of a state of the set of one or more parts of the product. Specifically, the crawler 105 crawls/traverses the customer's environment i.e., one or more servers or virtual machines, to fetch and analyze content associated with each part of the product. The obtained content corresponds to a state/configuration of the product. FIG. 3B depicts an exemplary information obtained by the crawler 105. For instance, as shown in FIG. 3B, with respect to content of an application artifact, the crawler 105 may obtain content including: a byte, a character (e.g., an escape character, white space character, etc,), lines of code, parameters and their associated values, etc. With regard to a database component, the crawler may obtain information including key-value pairs, information maintained in rows/columns of the tables of the database, etc.

Upon obtaining the above stated content from the different parts of the product, the baseline configuration generator 103 may generate a baseline configuration 115A that may be stored in the local storage unit 115. Additionally, the DaaS system 101 may also store a copy of the baseline configuration 115A in a cloud storage 140. It is appreciated that the baseline configuration may be associated with a timestamp parameter indicative of a time as to when the baseline configuration was generated. As will be described next, the timestamp parameter may be utilized by the DaaS system 101 to restore a state or configuration of the product to a prior state or configuration of the product.

By some embodiments, the DaaS system 101 of FIG. 1 can be utilized to perform a drift analysis process. Specifically, the set of one or more parts of the product may be updated due to various reasons e.g., a new release of a software or patch, a planned/scheduled maintenance of the product, etc. Such events may change portions of some parts of the product. Accordingly, the user may issue another request (e.g., check drift request) via the user interfaces or APIs 102. The drift analysis process corresponds to determining one or more differences (i.e., drifts) between a current state information for the set of one or more parts of the product and information in the baseline configuration 115A for the set of one or more parts of the product.

Upon receiving the request to perform drift analysis, the DaaS system 101 triggers the crawler 105 to crawl the customer's environment and obtain information associated with the set of one or more parts of the product. Upon obtaining the information, the crawler 105 triggers the comparator 107 of the DaaS system 101. As shown in FIG. 3A, the comparator 107 compares the current state information obtained for the set of one or more parts (i.e., current configuration 303 of the product) with a baseline configuration 301 i.e., previously generated for the product. The output of the comparator may be one of the following four options: (a) information included in baseline configuration but not in current configuration, (b) information included in the current configuration but included in the baseline configuration, (c) information included in both the baseline as well as the current configuration but modified, and (d) same information included in both the configurations. In this manner, by some embodiments, the comparator 107 identifies one or more differences between the current state information and information in the baseline for the set of one or more parts. Referring to FIG. 3B, it may be appreciated that the one or more differences may correspond to at least one of: new lines of code that are added, existing line of code that are deleted, parameters (and/or their associated values) being modified, new parameters being introduced, characters being modified, modification in information maintained in tables associated with databases of the product, etc.

In some embodiments, upon identifying the one or more differences between the current configuration of the product and the baseline configuration of the product, the comparator 107 may trigger the report generator 111 and the resolver 109. The report generator 111 generates a report that identifies content of each specific part of the product that drifted (i.e., is different) from the corresponding information of the part included in the baseline configuration. In other words, the DaaS system 101 identifies at what level of the product's hierarchy the changes have occurred. The report generated by the report generator may be output to the user via the UIs/APIs 102.

Figure 3C:
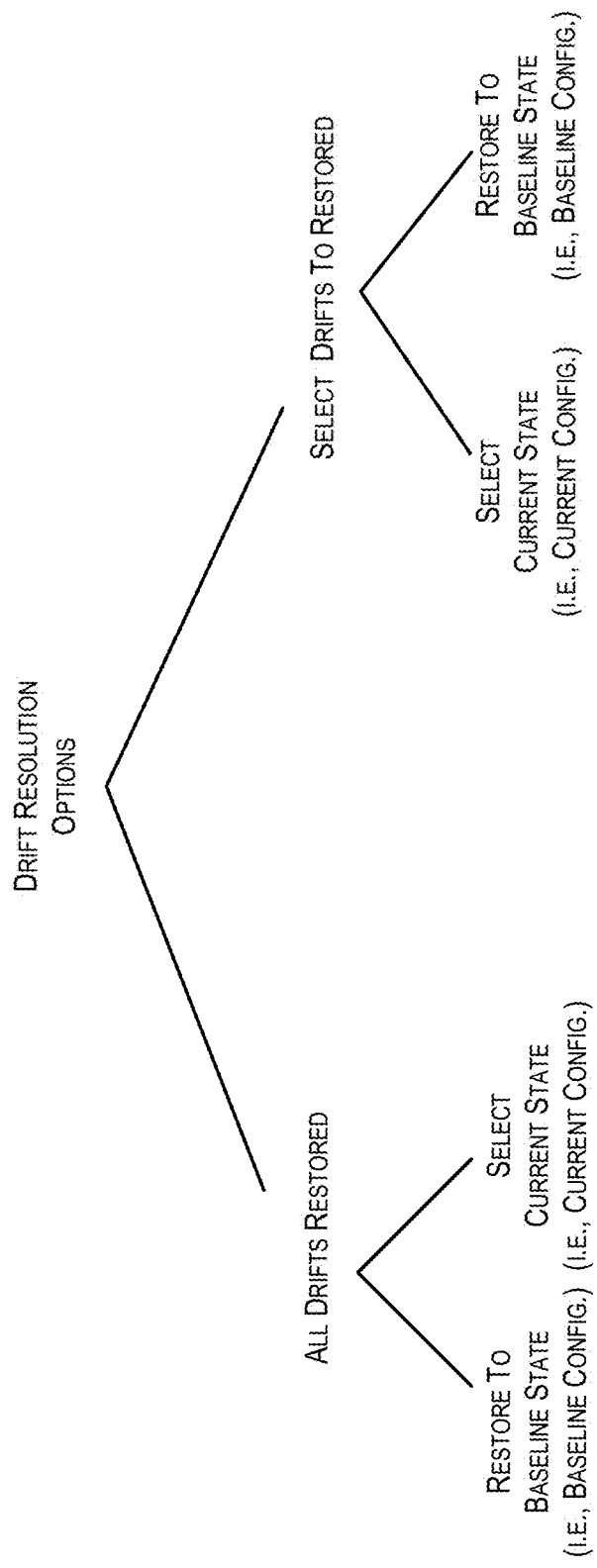
FIG. 3C depicts a tree diagram illustrating drift resolution options provided by the DaaS system according to certain embodiments.

The resolver 109 may provide options (via UIs/APIs 102) to the user to resolve the identified one or more differences between the current configuration of the product and the baseline configuration of the product. For instance, referring to FIG. 3C, the resolver may provide a first resolution option for restoring all the parts of the product in which a drift was identified. The resolver 109 may provide an option to restore information of each part of the product in which a drift was identified to the corresponding information of the part of the product maintained in the baseline configuration. Alternatively, the resolver 109 may provide the option to the user to select the current state information of each of the parts of the product. Such a situation may arise when the performance of the product is enhanced due to the updates performed on some or all of the parts of the product. In this case, the resolver 109 may trigger the configuration commit unit 113 that is programmed to store the current configuration of the product as a new baseline configuration 115A in the storage mediums 115 and/or 140. By some embodiments, it is appreciated that previously generated baseline configurations are not deleted from the storage mediums. As each baseline configuration (i.e., previously generated and newly added baseline configurations) is associated with a timestamp parameter, the DaaS system 101 provisions the user to select, at any given time, the configuration of the product to be restored to a specific baseline configuration. Furthermore, as shown in FIG. 3C, as a second resolution option, the resolver 109 may provide the user an option to selectively restore parts of the product. In this implementation, the user may choose to maintain a first set of parts of the product at a current configuration and restore a second set of parts of the product (different than the first set) to the corresponding baseline configuration.

Upon the resolver 109 of the DaaS system 101 providing the user, via the UIs/APIs 102, with a plurality of resolution options, the resolver 109 awaits to receive feedback from the user. Specifically, upon the resolver 109 receiving a selection of one of the resolution options from the user, the resolver 109 proceeds to resolve the one or more differences in accordance with the user selection. In this manner, the DaaS system 101 of FIG. 1 maintains a consistent state of the product and provides for a mechanism to reduce the MTTR (i.e., mean time to recover) for the parts of the product while reducing service level agreement (SLA) penalties.

Figure 4:
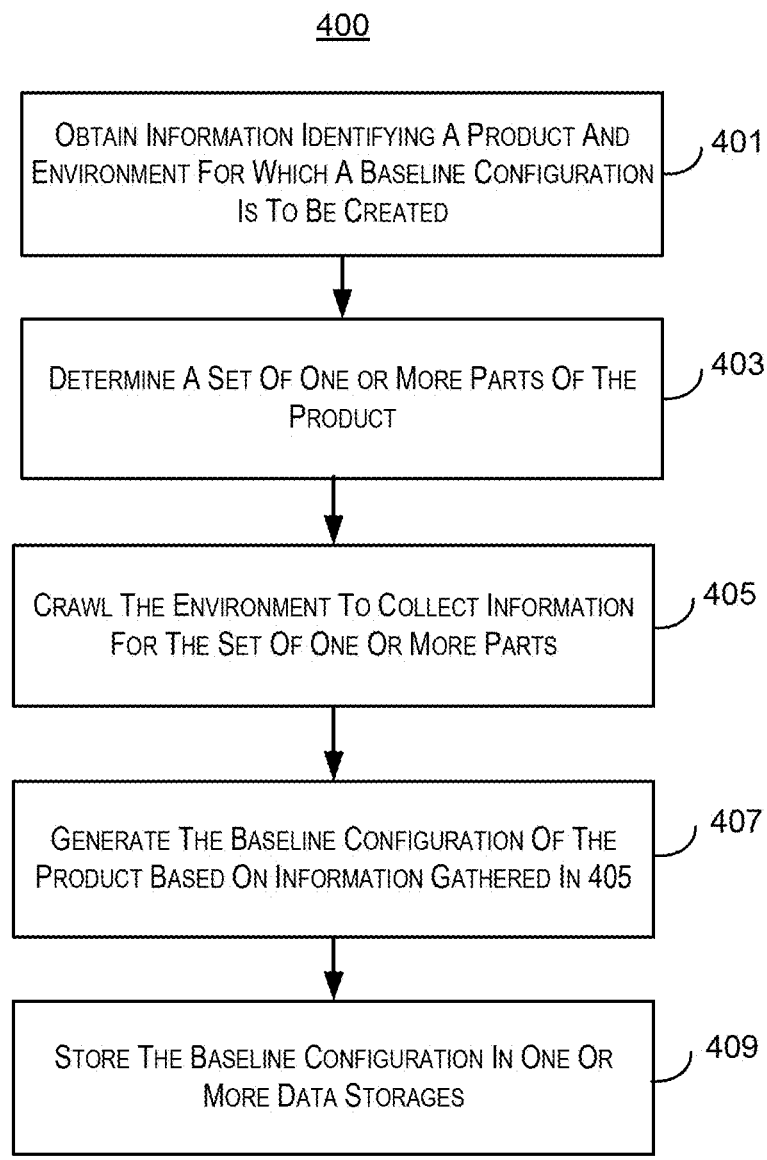
FIG. 4 illustrates a simplified flowchart depicting steps performed by the DaaS system in generating a baseline configuration according to certain embodiments.

FIG. 4 illustrates a simplified flowchart depicting steps performed by the DaaS system in generating a baseline configuration according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel.

The process commences in step 401, where the DaaS system obtains information identifying a product and an environment in which the product is deployed for which a baseline configuration (i.e., state information of a set of one or more parts of the product) is to be created. For instance, a user may issue a request (e.g., create baseline) to the DaaS system 101 of FIG. 1 via the user interface or a user API (e.g. UI/API 102). It is appreciated that the request may include information identifying the product (e.g., a product name), and include information regarding the environment (e.g., identifiers related to the one or more servers 120, or one or more virtual machines in the cloud 130) in which the product is deployed. In some implementations, the user request may also include information pertaining to the one or more parts that are included in the product (e.g., a configuration file of the product).

In step 403, a component of the DaaS system (e.g., the baseline configuration generator 103) extracts the above stated information from the user's requests and determines the set of one or more parts of the product. Note that as described previously with reference to FIG. 2, the parts of the product may include one or more applications and/or one or more databases. Further, each application may include one or more components (each of which further includes one or more artifacts) and each database may include one or more database objects, where the database object is a file or a table.

The process then moves to step 405, where the baseline configuration generator triggers a crawler (e.g., crawler 105) to crawl the environment in order to collect information for the set of one or more parts of the product. By one embodiment, the information related to the set of one or more parts of the product corresponds to content included in each part of the set of one or more parts of the product. For instance, content included in the parts of the product may be content as described previously with respect to FIG. 3. It is appreciated that the content of the set of one or more parts of the product forms a state (or a configuration) associated with the product. It is appreciated that an initial execution of crawling the environment results in a configuration of the product, which is referred to as a baseline configuration. Successive execution(s) of crawling the environment may result in successive configurations (e.g., new baseline configurations) of the product. As will be described below with reference to FIG. 5, the DaaS system 101 provisions for performing a drift analysis with respect to different configurations (i.e., different state information) of the product.

Thus, in one implementation, the baseline generator 103 of the DaaS system 101 obtains the content (step 405) and generates (in step 407), the baseline configuration of the product based on the content obtained in step 405. Further, the process moves to step 409, where the DaaS system 101 stores the generated baseline configuration in one or more data storages e.g., the baseline configuration may be stored locally (e.g., local storage 115) and/or be stored in a cloud storage (e.g. storage 140).

Figure 5:
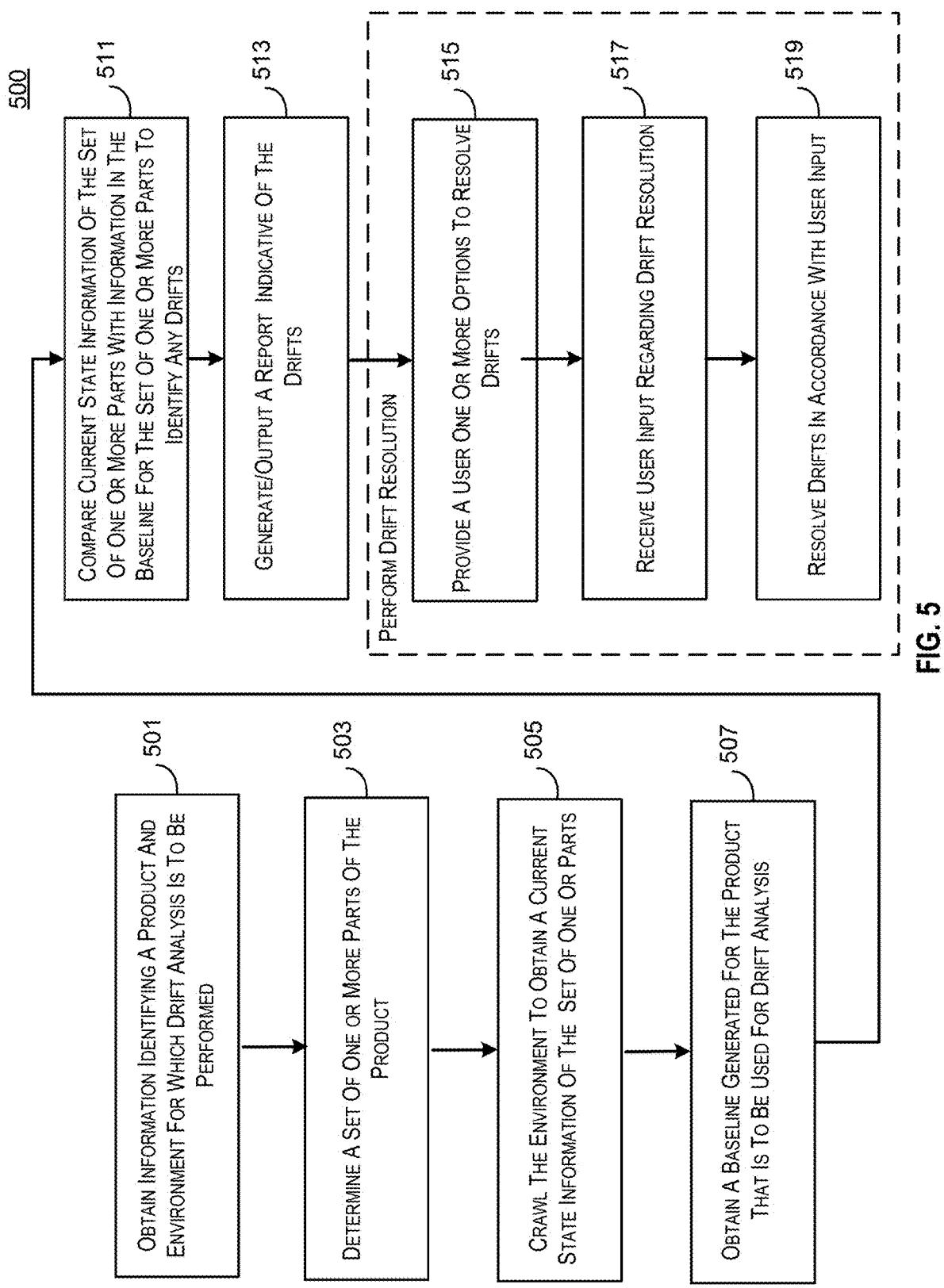
FIG. 5 illustrates a simplified flowchart depicting steps performed by the DaaS system in performing drift analysis according to certain embodiments.

FIG. 5 illustrates a flowchart depicting steps performed by the DaaS system in performing drift analysis according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

The process commences in step 501, where the DaaS system obtains information identifying a product and an environment in which the product is deployed for which drift analysis is to be performed. Drift analysis is defined herein as differences that are indicative as to how the product configuration has drifted from a baseline configuration of the product. A user may issue a request (e.g., check drift) to the DaaS system 101 of FIG. 1 via the user interface or a user API (e.g. UI/API 102). It is appreciated that the request may include information identifying the product (e.g., a product name), and include information regarding the environment (e.g., identifiers related to the one or more servers 120, or one or more virtual machines in the cloud 130) in which the product is deployed. In some implementations, the user request may also include information pertaining to the one or more parts that are included in the product (e.g., a configuration file of the product).

In step 503, the DaaS system extracts the above stated information from the user's requests and determines the set of one or more parts of the product. Note that as described previously with reference to FIG. 2, the parts of the product may include one or more applications and/or one or more databases. Further, each application may include one or more components (each of which further includes one or more artifacts) and each database may include one or more database objects, where the database object is a file or a table.

Further, the process moves to step 505, where the DaaS system triggers a crawler (e.g., crawler 105) to crawl the environment in order to collect information for the set of one or more parts of the product. By one embodiment, the information related to the set of one or more parts of the product corresponds to content included in each part of the set of one or more parts of the product. For instance, content included in the parts of the product may be content as described previously with respect to FIG. 3. It is appreciated that the content of the set of one or more parts of the product forms a current state (or a configuration) associated with the product. In step 507, a baseline configuration of the product is obtained that is to be used for drift analysis. It is noted that the baseline configuration may have been previously generated and stored (e.g., locally or in the cloud) for the product. The baseline configuration forms a reference with respect to which one or drifts (i.e., differences) in the current configuration are determined. Additionally, as stated previously, the DaaS system may store multiple baseline configurations (e.g., baseline configurations 115A). In this case, a particular baseline configuration may be selected based on a timestamp parameter associated with the baseline configuration i.e., a time stamp indicative of when the baseline configuration was generated. In some cases, the last generated baseline configuration may be selected for performing drift analysis.

The process then moves to step 511, where the DaaS system triggers a comparator (e.g., comparator 107) to compare the current state information of the set of one or more parts of the product with information (pertaining to the set of one or more parts of the product) included in the baseline configuration. Upon comparing the two sets of information (i.e., the current state information and information included in the baseline), the DaaS system identifies any drifts (i.e., differences) for each part of the set of one or more parts that are included in the product.

In step 513, a report generator included in the DaaS system (e.g., report generator 111) generates a report indicative of all the drifts identified in step 511. By some embodiments, the DaaS system provides the report to a user via a user interface or a user API (e.g. UI/API 102). Upon generating and outputting the report, the process performs steps 515-519 which are associated with performing a drift resolution process. Specifically, in step 515, the DaaS system provides the user (e.g., via APIs) one or more options to resolve the drifts identified in step 511 and included in the report generated in step 513. In one implementation, the DaaS system provides the user with resolution options as previously described with reference to FIG. 3C e.g., a first option to resolve all drifts, a second option to select certain drifts associated with certain parts of the product etc.

In step 517, the DaaS system receives an input from the user regarding a selection made with respect to the drift resolution options presented to the user in step 515. For instance, the DaaS system receives an input e.g., resolution action from the user via a user interface or a user API (e.g. UI/API 102). Upon receiving the user input with respect to the resolution options, the process in step 519 proceeds to resolve the drifts identified in step 511 in accordance with the user selection in step 517.

Example Infrastructure as Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
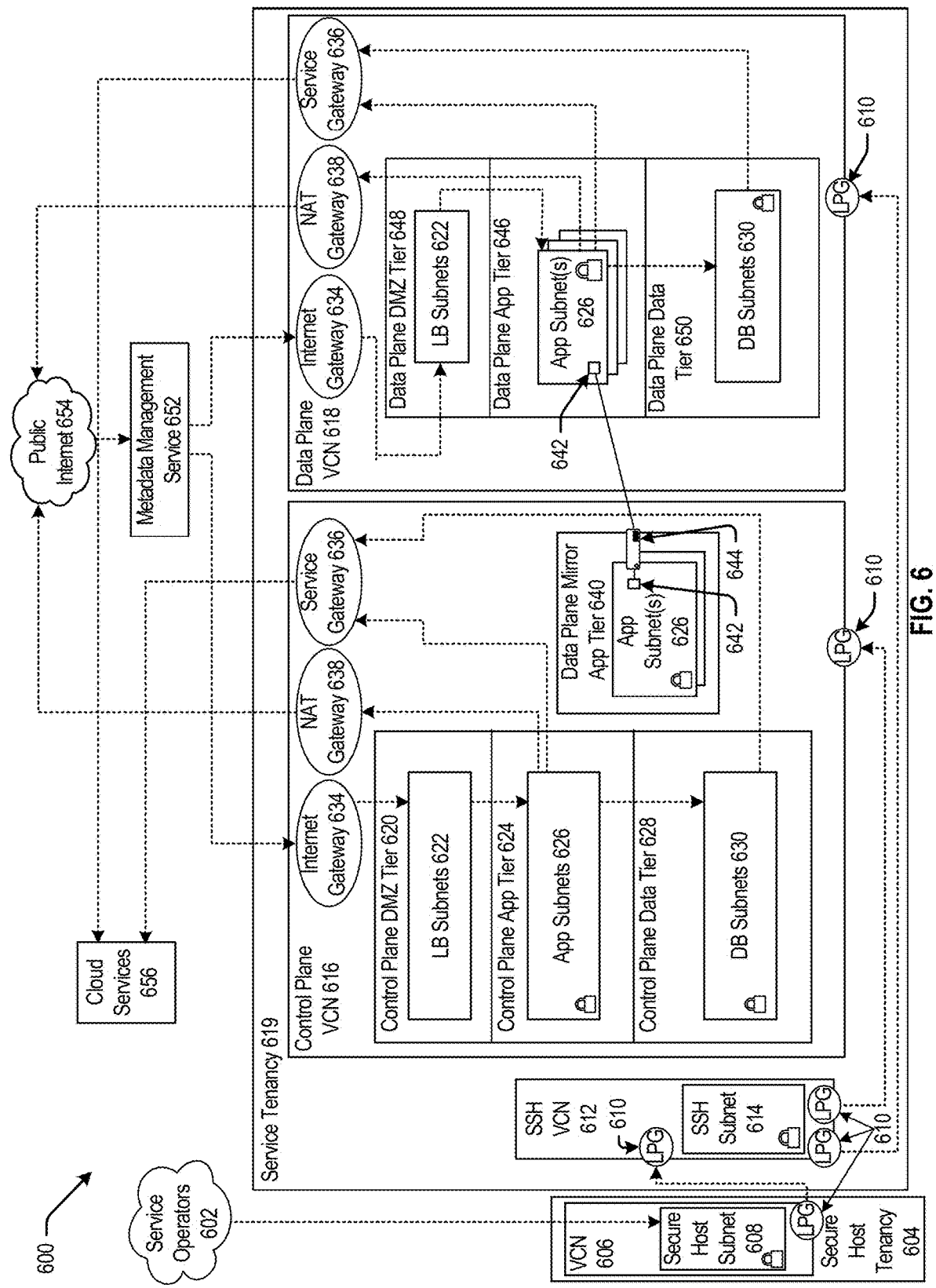
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
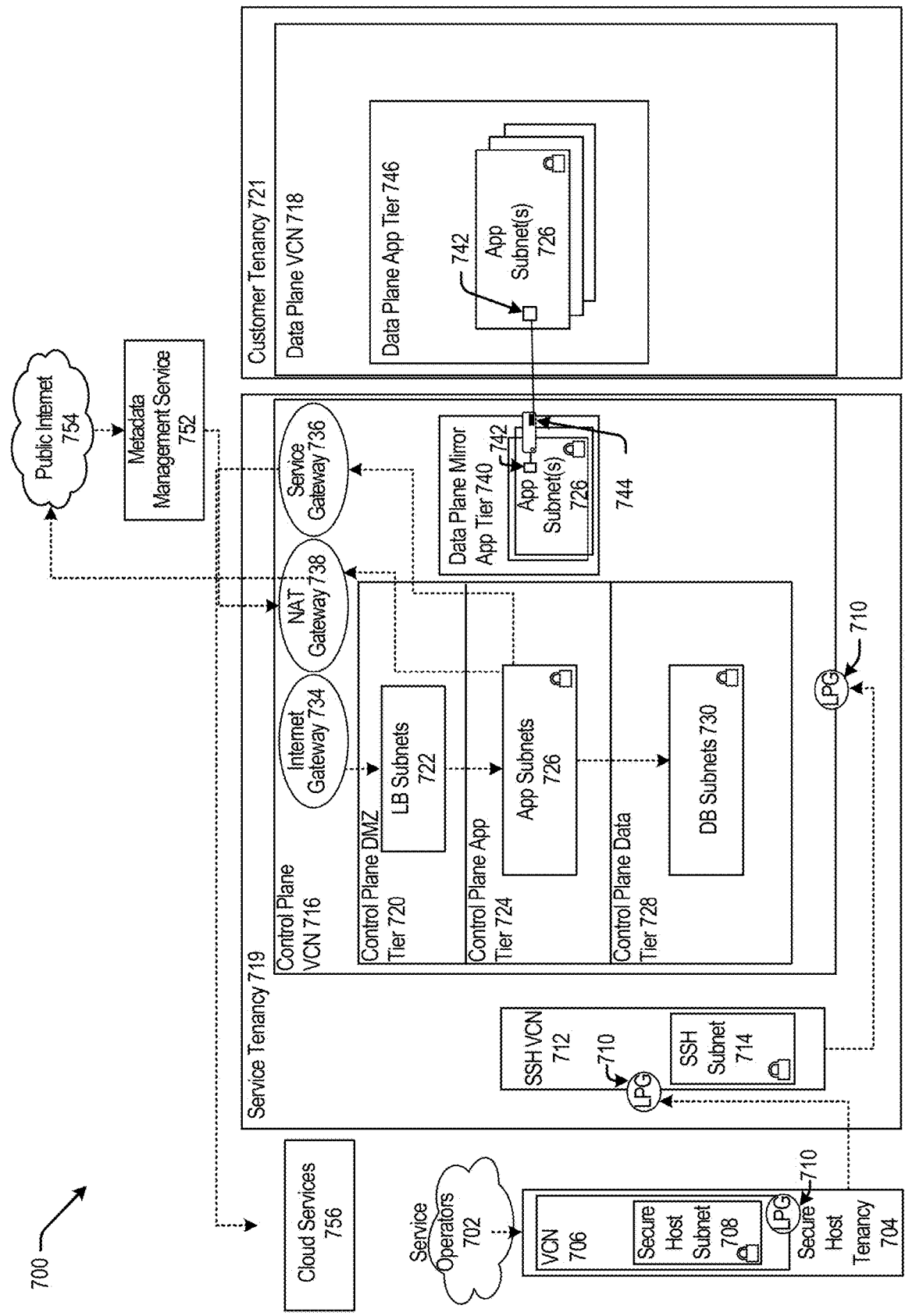
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
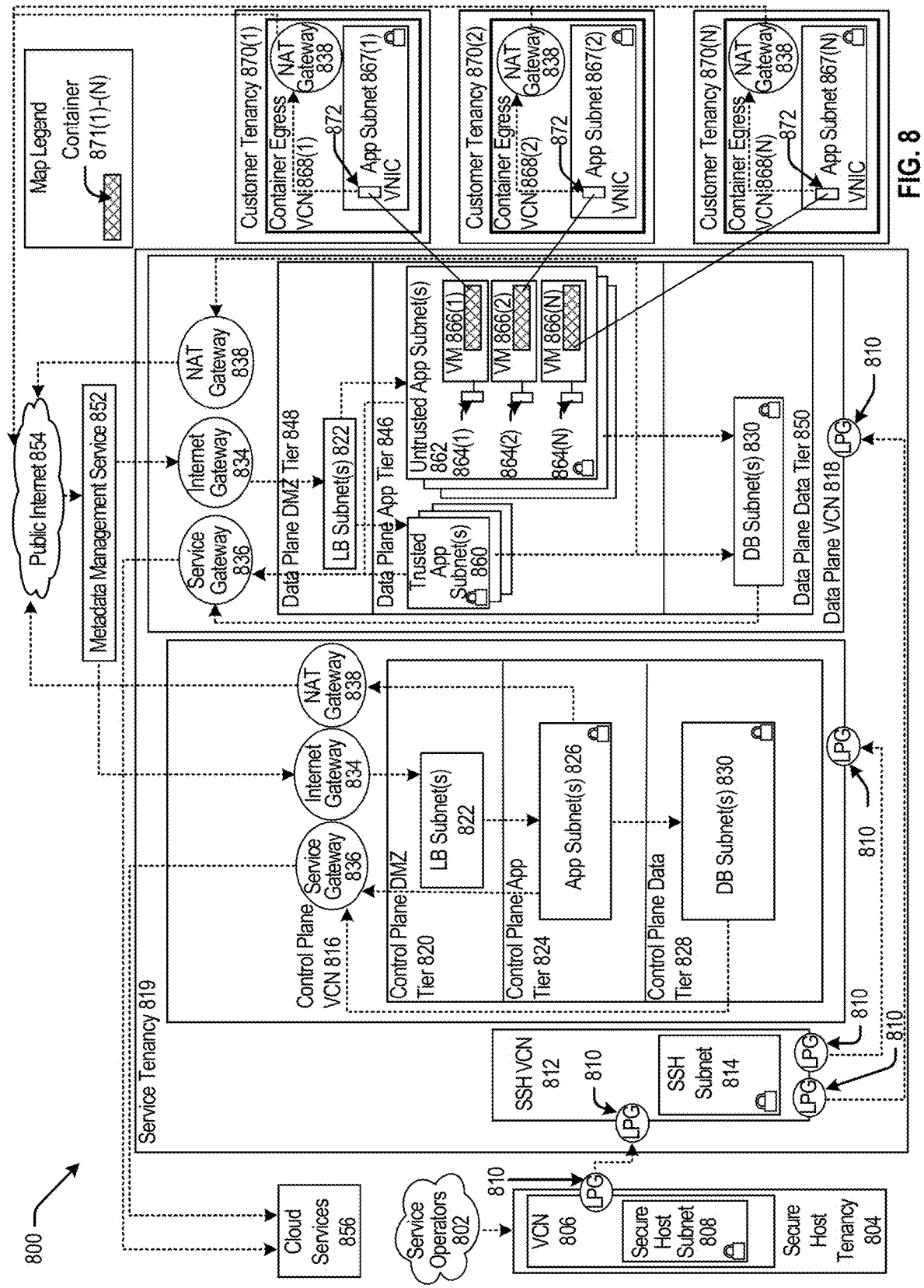
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
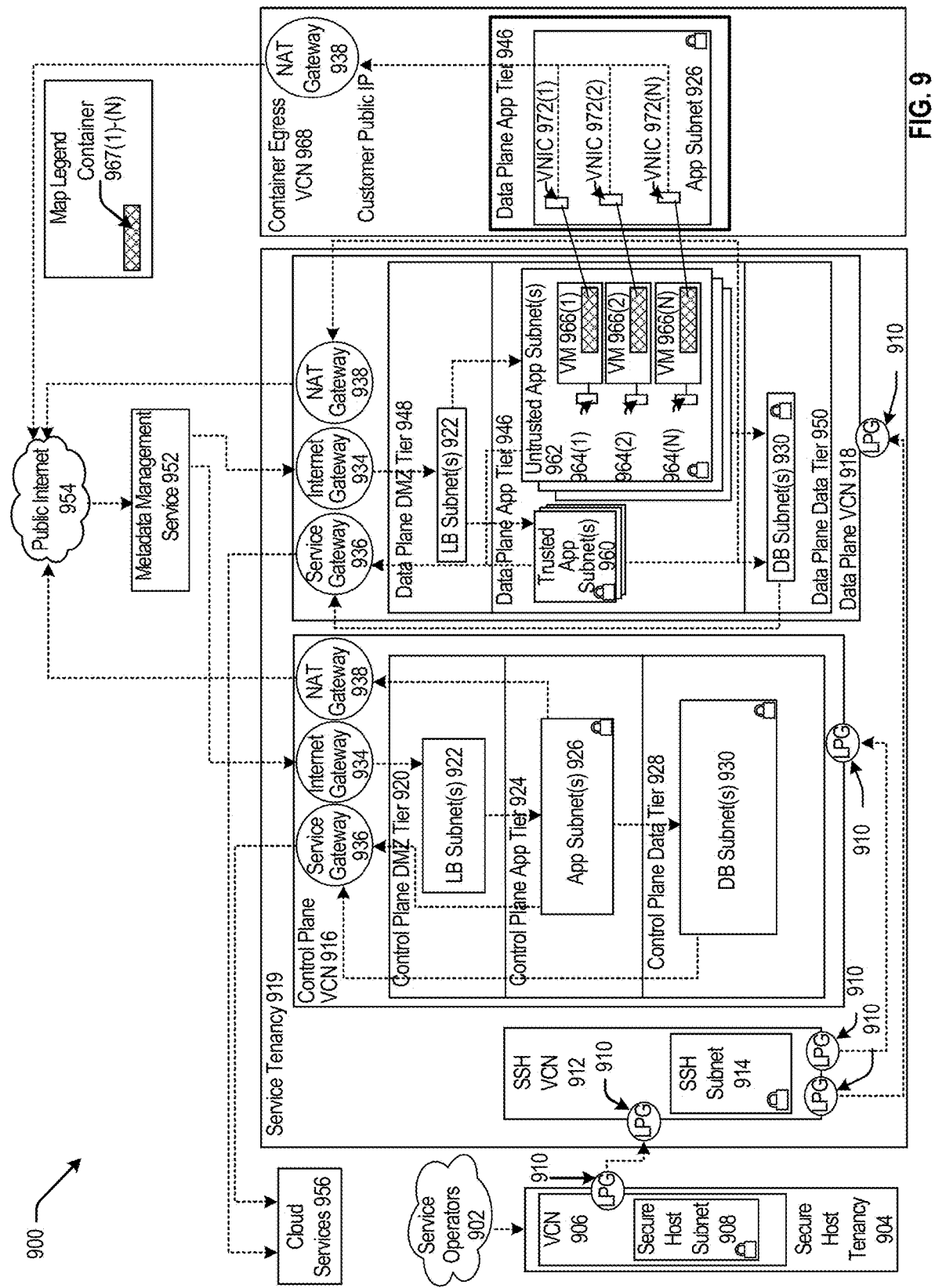
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
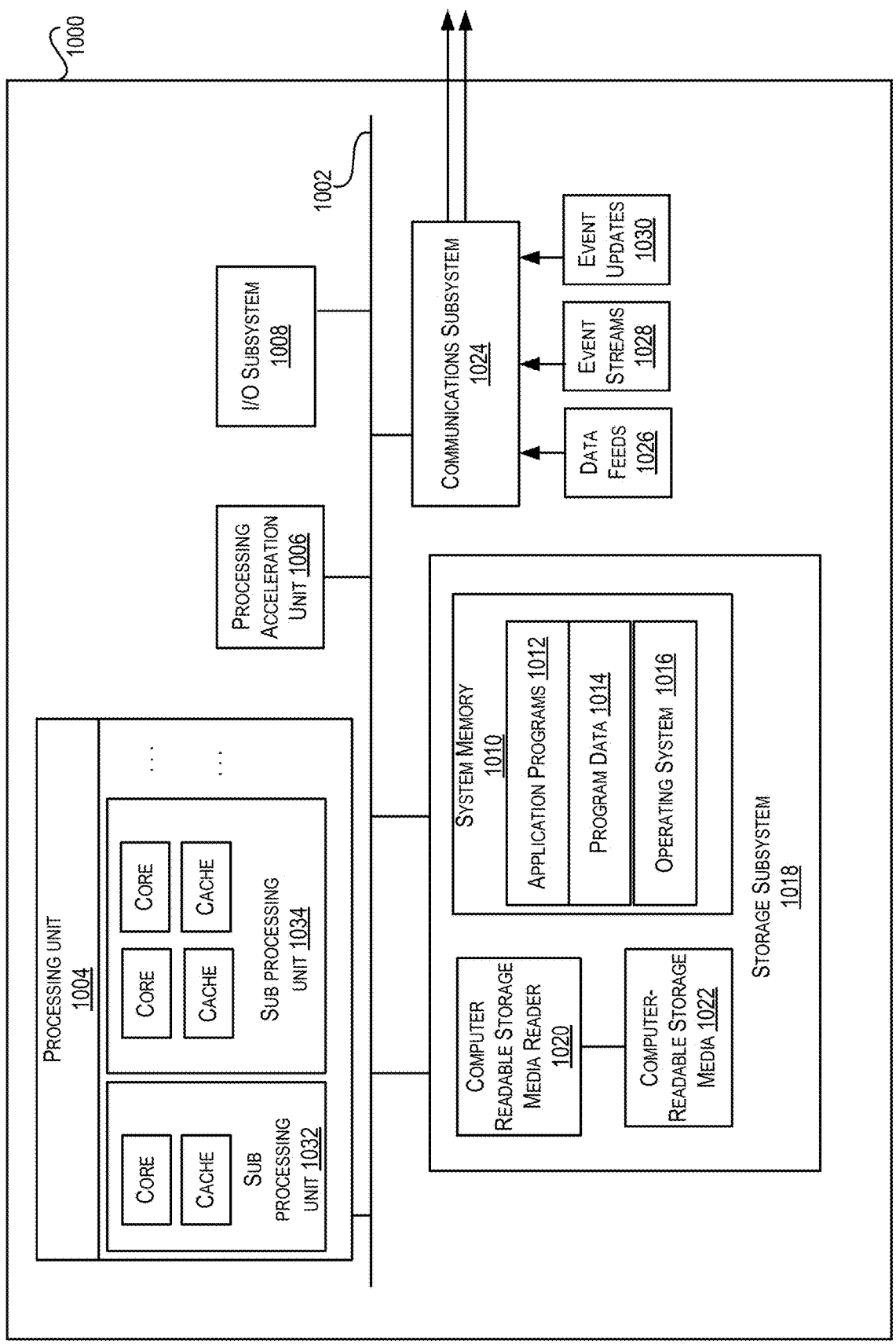
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
for a product for which drift analysis is to be performed, determining a set of one or more parts of the product;
obtaining current state information for each part included in the set of one or more parts by crawling an environment in which the product is deployed;
comparing the current state information obtained for each part included in the set of one or more parts with a baseline generated for the product to identify one or more differences between the current state information of the part and information corresponding to the part in the baseline, wherein the information corresponding to the part in the baseline is indicative of a state of the part when the baseline was generated;
generating a report indicative of the one or more differences for each part included in the set of one or more parts; and
outputting the report.

2. The method of claim 1, wherein the set of one or more parts of the product include one or more applications.

3. The method of claim 1, wherein the set of one or more parts of the product includes one or more databases.

4. The method of claim 2, wherein each of the one or more applications includes at least one application component.

5. The method of claim 4, wherein the at least one application component includes one or more artifacts.

6. The method of claim 3, wherein each of the one or more databases includes at least one database object, the at least one database object being one of a file or a table.

7. The method of claim 1, wherein the environment corresponds to one or more servers deployed in a datacenter.

8. The method of claim 1, wherein the environment corresponds to one or more virtual machines deployed in a cloud environment.

9. The method of claim 1, wherein the current state information for the set of one or more parts corresponds to content included in each part of the set of one or more parts of the product.

10. The method of claim 9, wherein the set of one or more parts includes one or more artifacts of an application, and the content included in the one or more artifacts includes a byte, a character, new lines of code, or parameters and their associated values.

11. The method of claim 9, wherein the set of one or more parts includes a database comprising one or more tables, and the content corresponds to data maintained in the one or more tables.

12. The method of claim 1, further comprising:
providing to a user, one or more options to resolve the one or more differences;
receiving a user selection with respect to the one or more options; and
resolving the one or more differences in accordance with the user selection.

13. The method of claim 12, wherein a first option of the one or more options corresponds to resolving the one or more differences by restoring the set of one or more parts to the state of the set of one or more parts associated with the baseline.

14. The method of claim 13, wherein a second option of the one or more options corresponds to resolving the one or more differences by (1) restoring a first subset of parts of the set of one or more parts to a corresponding state of the first subset of parts associated with the baseline, and (2) maintaining, for a second subset of parts of the one or more parts to have the current state information associated with the second subset of parts.

15. A computing device comprising:
a processor; and
a memory including instructions that, when executed with the processor, cause the computing device to, at least:
for a product for which drift analysis is to be performed, determining a set of one or more parts of the product;
obtain current state information for each part included in the set of one or more parts by crawling an environment in which the product is deployed;
compare the current state information obtained for each part included in the set of one or more parts with a baseline generated for the product to identify one or more differences between the current state information of the part and information corresponding to the part in the baseline, wherein the information corresponding to the part in the baseline is indicative of a state of the part when the baseline was generated;
generate a report indicative of the one or more differences for each part included in the set of one or more parts; and
output the report.

16. The computing device of claim 15, wherein the set of one or more parts of the product include one or more applications or one or more databases.

17. The computing device of claim 16, wherein each of the one or more applications includes at least one application component, and wherein each of the one or more databases includes at least one database object, the at least one database object being one of a file or a table.

18. The computing device of claim 15, wherein the environment corresponds to one or more servers deployed in a datacenter or one or more virtual machines deployed in a cloud environment.

19. The computing device of claim 15, wherein the current state information for the set of one or more parts corresponds to content included in each part of the set of one or more parts of the product.

20. A non-transitory computer readable medium storing specific computer-executable instructions that, when executed by a processor, cause a computer system to perform operations comprising:
for a product for which drift analysis is to be performed, determining a set of one or more parts of the product;
obtaining current state information for each part included in the set of one or more parts by crawling an environment in which the product is deployed;

comparing the current state information obtained for each part included in the set of one or more parts with a baseline generated for the product to identify one or more differences between the current state information of the part and information corresponding to the part in the baseline, wherein the information corresponding to the part in the baseline is indicative of a state of the part when the baseline was generated;

generating a report indicative of the one or more differences for each part included in the set of one or more parts; and outputting the report.

* * * * *